RICHARD B. SHELDON, Imp'd Seed Drill.
No. 118,821.  Patented Sep. 12, 1871.
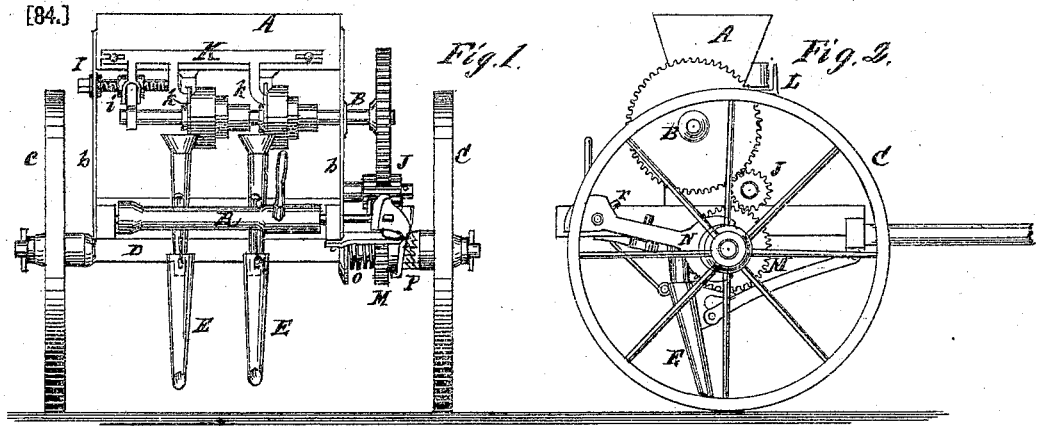
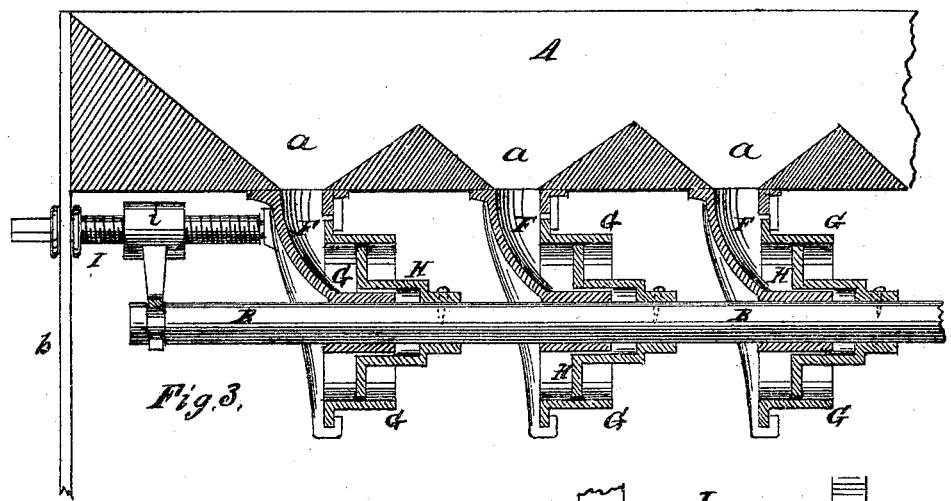
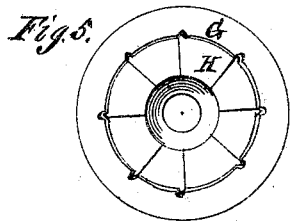
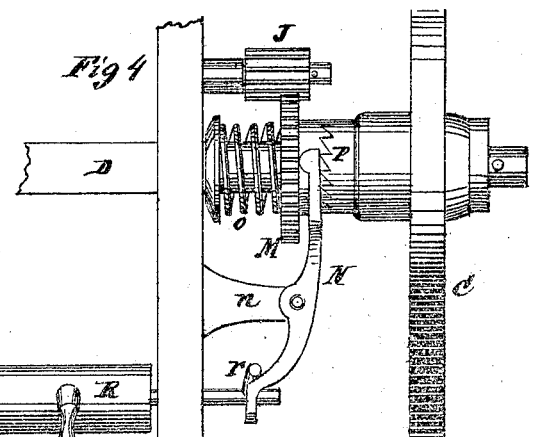
Inventor.
R. B. Sheldon
Witnesses.
D. Hitchcock
F. A. Morley 118,821

UNITED STATES PATENT OFFICE.

RICHARD B. SHELDON, OF CANASTOTA, NEW YORK.

IMPROVEMENT IN SEED-DRILLS.

Specification forming part of Letters Patent No. 118,821, dated September 12, 1871.

*To all whom it may concern:*

Be it known that I, RICHARD B. SHELDON, of Canastota, in the county of Madison and State of New York, have invented a new and useful Improvement in Seed-Drills; and I do hereby declare that the following is a full, clear, and exact description thereof, which will enable those skilled in the art to make and use the same, reference being had to the accompanying drawing forming part of this specification, in which—

Figure 1 is a rear view of my invention, and Fig. 2 is a side view. Figs. 3, 4, and 5 are detail views.

Similar letters of reference indicate corresponding parts in the several figures.

This invention relates more especially to an improved construction and arrangement of parts, whereby the capacity of the seed-dropping devices can be changed or regulated with the greatest facility. All the seed-delivering disks or wheels are attached rigidly to a central shaft that is common to all, so that by a longitudinal movement or adjustment of said shaft all of the seed-disks are moved in their cases simultaneously and the delivering capacity of the machine made greater or lesser, as desired, merely by the longitudinal adjustment of the shaft, as before mentioned, the movement of said shaft being controlled by an adjusting-screw, as herein shown, or by other suitable device. The invention consists in the combination, with the seed-delivering disks and revolving open cylinders, of casings of peculiar curvature and construction. My invention further consists in an improved combination and arrangement of devices for making connection between the seed-shaft and driving-wheel, as hereinafter more fully described.

In the accompanying drawing, A is the seed-box. B is the seed-shaft, and C the driving-wheel. The seed-box A is mounted on an axle, D, and wheels C c by a suitable frame and standards b, as usual, and below each of the several openings a, Fig. 3, of the seed-box is attached a seed-wheel that feeds the seed from the box into the spouts E, Fig. 1. Each seed-wheel or feeding device is made up of a shell, F, that is fastened to the lower side of the box, in one side of which is a revolving-case, G, of cylindrical form, open at both ends, as seen in sectional view, Fig. 3, within which case is a disk or collar, H, that is fixed on the seed-shaft B. The seed enters the shell F from the seed-box and, passing into the revolving-case G, is carried around up to the discharging openings in the rear side of the shell F, and is discharged into the conductors or spouts E, as ordinarily. It will be noticed that these seed-delivering devices are of peculiar construction, the shells E being so curved as to conduct the seed into the cylinders G, in which it is carried around to the point of discharge. The disks or collars H are all fastened to the shaft B, and as this shaft is moved longitudinally by the adjusting-screw and nuts I i the disks H are moved in the cases G so as to increase or diminish the seed-spaces therein, according to the direction in which the shaft and disks are moved, and in this manner the feed is regulated at will, the turning of the screw I moving all of the disks H simultaneously and with uniformity. The intermediate pinion J of the driving-gears is made long enough to accommodate the side movement of the gear B as it moves with the adjusting movement of the seed-shaft. To prevent the grain from being thrown over in the cases G when the disks H are drawn back, I provide self-adjusting stops k k, that are attached to a bar, K, which slides on the back of the seed-box and is carried by an arm that makes connection with the nut i, Fig. 1. The position of the disks H and the quantity of grain that is being delivered to the acre is indicated by an index, L, that is located on the bottom and front of the box, as shown in Fig. 2. This indicator is actuated by the adjusting-nut i, the said indicator having a fixed fulcrum on the seed-box and the movement of the nut i giving motion to its other end. It can be fixed rigidly to the nut i, but by its having a fulcrum on the box A the movement of the nut is exaggerated, so that smaller movements are more readily indicated. The feeding-disks H have ribs or projections on their grain faces, as shown in Fig. 5, and these disks are also made to engage with their cases G to rotate the same by ribs or teeth on their periphery, as also seen in Fig. 5, while, at the same time, the disks are free to move in said cases with the shaft, the teeth fitting loosely in the corresponding grooves in the cases G. Fig. 4 shows the construction and arrangement of driving-connections. On the axle D is a gear, M, running loose thereon. It has on its outside a ratchet-face that engages with a similar face, P, on the hub of the driving-wheel C, and has a coiled spring, o, on its inner face that holds it engaged with the driving-wheel in a detachable manner. A forked lever, N, is pivoted to a stud, n, of the frame-work in such manner that when the windlass R is rotated to elevate the spouts E from the ground a pin, r, of said windlass acts on the cam end of lever N to disengage the gear M from the driving-wheel, the said gear sliding on the long pinion J the same as the gear of the seed-shaft, so that the gears are always engaged with each other, which makes a smoother connection. In no case can the feeding-gears be run backward, as the inclined faces of the ratchet-wheel compress the spring o and throw them out of action.

By these means the machine is quickly changed or set to sow any quantity to the acre that is desired, and a desirable arrangement and connection of the parts with the driving-wheel is obtained.

I am aware that it is not new to attach the seed-delivering devices to a common shaft to provide for simultaneous adjustment; therefore I lay no claim to this feature.

Having thus described my invention, what I claim, and desire to secure by Letters Patent, is—

The shells F and inside feed-wheel G, said wheel being made in two sections, one of which is attached rigidly to the shaft B, the other sliding upon the same to admit of the adjustment described by the set-screw I i, substantially as set forth.

The above specification of my invention signed by me this 25th day of March, 1871.

R. B. SHELDON.

Witnesses:
D. HITCHCOCK,
F. A. MORLEY.